United States Patent [19]
Bolton

[11] Patent Number: 5,259,955
[45] Date of Patent: Nov. 9, 1993

[54] VACUUM STRAINER

[76] Inventor: Joseph A. Bolton, Summit La., Queensbury, N.Y. 12801

[21] Appl. No.: 728,891

[22] Filed: Jul. 10, 1991

[51] Int. Cl.⁵ .................. B01D 29/37; B01D 29/66; B01D 29/86
[52] U.S. Cl. ................... 210/406; 210/409; 210/797; 210/808; 210/413; 210/415; 210/497.01; 210/497.3; 239/107; 239/524; 209/283; 209/380
[58] Field of Search ............... 210/406, 409, 808, 797, 210/408, 413, 414, 415, 497.3, 497.01, 416.1; 239/107, 524; 209/281, 283, 268, 380

[56] References Cited

U.S. PATENT DOCUMENTS

| | | | |
|---|---|---|---|
| 785,522 | 3/1905 | Robinson | 210/415 |
| 946,476 | 1/1910 | Warner | 209/304 |
| 1,201,014 | 10/1916 | Boudwin | 210/408 |
| 1,993,214 | 3/1935 | Hass | 210/408 |
| 2,582,401 | 1/1952 | Stinson | 210/409 |
| 2,588,976 | 3/1952 | Fuhrmeister | 210/808 |
| 2,608,910 | 9/1952 | McCrystle | 210/808 |
| 3,112,263 | 11/1963 | Ellila | 210/411 |
| 3,409,139 | 11/1968 | Jackson | 210/406 |
| 3,990,637 | 11/1976 | Nicholson | 234/456 |
| 4,081,381 | 3/1978 | Rosenmund | 210/414 |
| 4,347,134 | 8/1982 | Svehaug | 210/414 |
| 4,376,705 | 3/1983 | Komura | 210/413 |
| 4,412,920 | 11/1983 | Bolton | 210/413 |
| 4,431,541 | 2/1984 | Lee | 210/411 |
| 4,495,070 | 1/1985 | Pierson | 210/409 |
| 4,569,762 | 2/1986 | Gandfrin | 210/406 |
| 4,828,697 | 5/1989 | Kuhut | 210/413 |
| 4,944,873 | 7/1990 | Williams | 210/406 |

FOREIGN PATENT DOCUMENTS

| | | | |
|---|---|---|---|
| 232128 | 8/1987 | European Pat. Off. | 210/409 |
| 2446746 | 4/1985 | Fed. Rep. of Germany | 210/413 |
| 3606184 | 8/1987 | Fed. Rep. of Germany | 210/409 |
| 3638371 | 5/1988 | Fed. Rep. of Germany | 210/406 |
| 2052847 | 10/1979 | Japan | 210/415 |
| 2063505 | 3/1990 | Japan | 210/414 |
| 8504340 | 10/1985 | PCT Int'l Appl. | 210/409 |
| 607866 | 5/1978 | U.S.S.R. | 209/283 |
| 5760 | of 1913 | United Kingdom | 209/304 |
| 2217223 | 10/1989 | United Kingdom . | |

Primary Examiner—Thomas M. Lithgow
Attorney, Agent, or Firm—Kane, Dalsimer, Sullivan, Kurucz, Levy, Eisele and Richard

[57] ABSTRACT

A strainer device is disclosed for continuously separating liquids from a solid/liquid mixture, the strainer including a screen receiving said solid/liquid mixture and a container under reduced pressure disposed under the screen to collect the strained liquid. High pressure fluid is used to roll the solids off the screen to insure that the solids do not plug the screen. If recycled water is used, a spring-loaded nozzle is also provided which may be purged. The device may also be used for thickening a solid liquid mixture. Preferably an angled or conical screen is used.

11 Claims, 3 Drawing Sheets

VACUUM STRAINER

BACKGROUND OF THE INVENTION
A. Field of Invention

This invention pertains to a screen filter device used for separating a solid/liquid mixture for recovering the solids, cleaning the liquid, or thickening the liquid and more particularly to a screen filter device in which the screen is continuously washed by a high power spray, with the straining being vacuum assisted.

B. Description of the Prior Art

U.S. Pat. No. 4,412,920, (commonly assigned with the present invention) discloses a filter device with a screen and a top spray arranged so that the liquid flows through the screen and the solids are forced along the screen toward a central opening. While this device works satisfactorily to separate the solids from the liquid, its capacity can not be increased because at higher volumes, the solids tend to staple to the screen plugging it up. A similar problem occurs if a finer screen is used to remove smaller solids.

OBJECTIVES AND SUMMARY OF THE INVENTION

In view of the above mentioned disadvantage of the prior art, an objective of the present invention is to provide a strainer device which can handle a larger volume of liquid and/or liquid having a higher concentration of particulate matter.

A further objective is to provide a strainer device which can be used with a finer mesh without decreasing the capacity of the strainer.

Yet a further objective is to provide a device which shares many components with previous strainer devices thereby limiting retooling and redesign costs.

Other objectives and advantages shall become apparent from the following description of the invention.

I have discovered that the performance of a strainer device of the type described above is improved significantly if a vacuum is applied under the screen, thereby applying an additional force on the liquid being strained to force it through the screen. One would expect that applying a vacuum would not work because the vacuum forces the solids to staple to the screen thereby plugging the screen up in a very short time period. However, I have found that this effect is prevented if a high pressure cleansing fluid is directed at the screen at the same time, at an angle with the nominal plane or surface of the screen to force the solids strained by the screen to roll toward the central opening before the solids are stapled to the screen. Moreover, the capacity of the strainer can be further increased by disposing the stray screen at an angle of 0°-45° whereby the movement of the solids is gravity assisted.

DESCRIPTION OF THE PREFERRED EMBODIMENT

Figure 1:
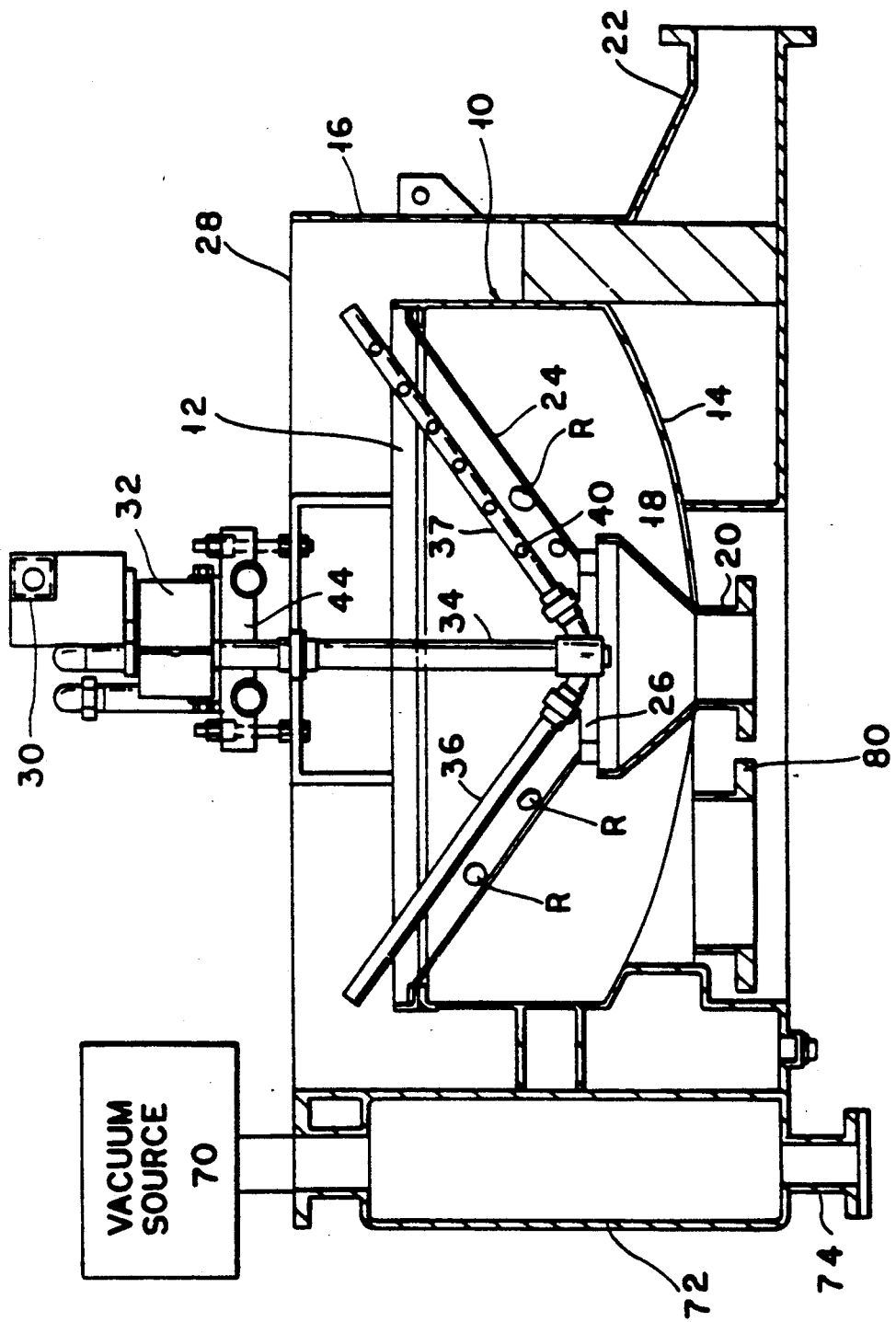
FIG. 1 shows a side elevational view of a straining device constructed in accordance with this invention.

In the following description the term mixture shall refer to the material comprised of a mixture of solids and liquids to be strained. The material drained through the screen shall be referred to as a liquid even though it may contain particulate matter, and the material collected from the top of the screen shall be called the concentrate or solids.

The filter device 8 of the subject invention is shown in the Figures and includes cylindrical container 10 having an open top and a bottom 12 and 14 respectively concentrically arranged within feed container 16, the side wall thereof extending above container 10. A third container 18, also concentrically arranged, is disposed within container 10 with its open top considerably beneath the top of container 10 and its bottom communicating with and arranged to feed into an outlet pipe 20. An inlet pipe 22 is provided for feeding the mixture into feed container 16. A screen 24 extends from the edge of container 10 to the top of container 18. The screen is provided with a circular center opening 26 above container 18. Preferably, the screen is conical so that it is tilted toward opening 26, for example, by about 0°-45°. More particularly, for screening or filtering, a generally low angle maybe used, while for thickening the mixture, generally a steeper angle may be more desirable.

A cove 28 is provided for feed container 16. Motor 30 and gear reduction box 32 which are supported by the cover rotate shaft 34 which projects downwardly through the cover. On the end of shaft 34 there are mounted radially disposed spray pipes 36, 37 and 38, angled in parallel with screen 24, which support a series of spray nozzles 40. Three such pipes are shown in the present embodiment however more or less such pipes can be provided.

Figure 2:
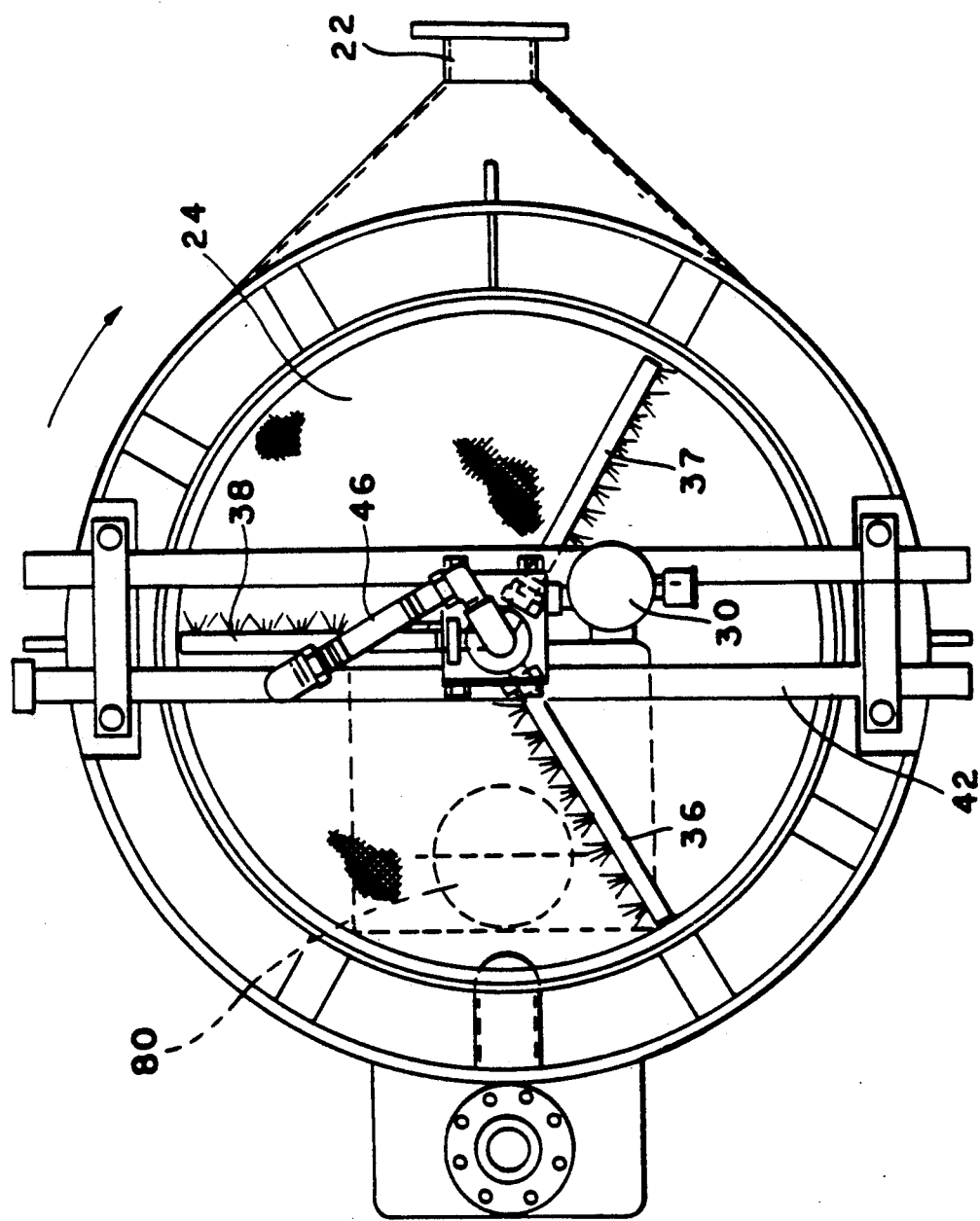
FIG. 2 shows a plane view of the shower heads and the screen of the apparatus of FIG. 1.

Shaft 34, which is hollow, extends upwardly from the gear box to a rotating swivel joint 44. Conduit 46 is provided to supply cleansing water, or other fluid to the spray nozzles 40 via shaft 34 from an outlet shower inlet 42. The nozzles 40 are arranged to direct the spray at an angle to the surface of the screen. The angle may be in the order of 10° to 45° with the screen. Importantly, while in the prior art device described in U.S. Pat. No. 4,412,920 the jet from the spray nozzles impinges on the screen at a pressure in the order of 15-20 lbs/sq. in., in the present invention, a smaller nozzle is used to increase the pressure of the cleansing fluid to a much higher lever in the range of 50-60 lbs/sq. in. I have found that while the old shower nozzles utilizing lower pressures tended to merely push the solids accumulated on the screen, this higher pressure spray causes the solids to move along the screen at a much faster speed in a rolling motion, as indicated in FIG. 1 schematically by generally cylindrical shapes R. In this manner, as the spray arms rotate in a clockwise direction as seen from above and as shown in FIG. 2, the solids picked up by the screen 24 on the upper surface of the screen, are rolled toward the center 26 by the high pressure cleansing liquid from the shower nozzles.

Referring back to FIG. 1, the subject filter device also includes a low pressure generating means such as a vacuum source 70 connected to a vertical pipe 72 terminating with a drop leg 74. Source 70 may be a vacuum pump, or other well known means of producing a vacuum. A smaller pipe 76 connects pipe 72 to the interior of container 10. This arrangement is used to introduce a vacuum in the container, in the order of 1-12" inches of water below ambient pressure.

In operation, the mixture containing a liquid and solids enter the feed container 16 through inlet 22. This liquid builds up to a height where it overflows the wall of container 10, flows onto screen 24. The strained liquid and fines (particles smaller than the intercises of the screen 24) are forced through the screen 24 and into container 10, downwardly by the combined force of gravity and the pressure drop across the screen 24.

The larger particles or solids contained in the mixture do not pass through the screen. Instead, the fluid from the spray nozzles 40 impinges at high pressure on the upper surface of the screen as the arms rotate to force these large particles to conglomerate and roll toward the center as described above. Gravity, and the flow of the liquids from the spray nozzle forces the particles into container 18 and out through conduit 20 for collection or disposal.

The liquid passing through screen 24 is collected in container 10 and withdrawn through outlet pipe 80.

Thus a simple, rugged and easy to use separation unit is provided which will require a minimum of operating power and maintenance. It was found that with a 48" O.D., 200 mesh size filter, and under the conditions described above, the capacity of the strainer was increased from 186 GPM using the arrangement described in U.S. Pat. No. 4,412,920 to 360 GPM. Moreover, while the prior art device could only be operated with a screen made of a 200 mesh filter media, the vacuum strainer device described above could be used with 325 mesh filter media, thereby reducing the size of the fines in the liquid considerably.

Figure 3:
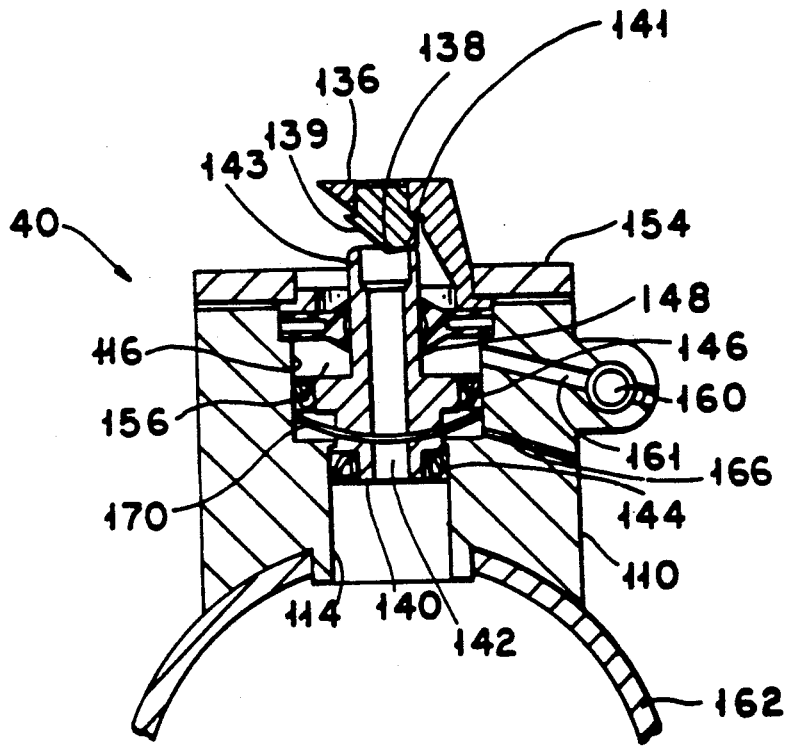
FIG. 3 shows a sectional view of a nozzle used in the apparatus of FIG. 1.
Figure 4:
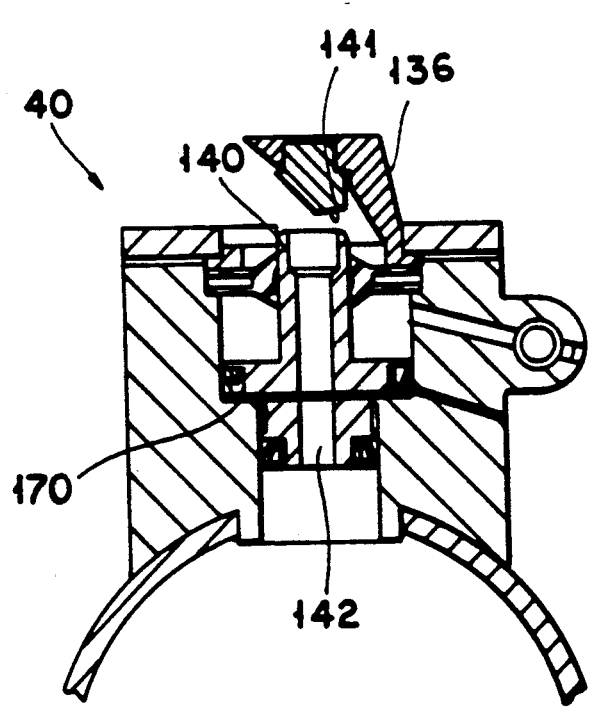
FIG. 4 shows the nozzle of FIG. 3 in the purge position.

The fluid ejected from the nozzles 40 could be clean water, however in many industrial applications recycled water is preferable for economical as well as environmental reasons. Of course, recycled water may contain fines which may clog up the small-sized orifice, high pressure nozzles 40. Therefore, the nozzles must be purged at regular intervals to clear out any fines that have accumulated inside thereof. A preferred nozzle 40 well suited for this purpose is shown in FIGS. 3 and 4. Except as noted, this nozzle 40 is similar to the nozzle disclosed in commonly assigned U.S. Pat. No. 3,990,637.

As shown in FIG. 3, nozzle 40 has a generally tubular body member or casing 110, which is preferably formed of a metal such as stainless steel, which is in alignment with and projecting through the spray hole 111 in the wall of spray pipe 162. The member which has a small diameter cylindrical section 114 and a cylindrical section 116 of greater diameter. Section 114 is in communication with the interior of pipe 162.

A bracket 136 projects upwardly and supports valving member 138 in position and for a purpose as will be explained below.

Piston 140 is slidably fitted within the bore of casing 110. The piston has a central passage 142 formed therein which communicates the interior of the spray pipe to the outside.

Lip seals 144, 146 and 148 are dispensed between the piston and the respective interior surfaces of the number 110.

The bracket 136 projects upwardly from a washer 154 and forms a hood therewith to support valving member 138. The valving member 138 has a generally cylindrical body whose centerline is an extension of the centerline of central passage 142. A convex slice has been removed therefrom to form an angled spray surface 139. Surface 139 is an impinging surface for the water and determines the spray configuration. Accordingly, the particular configuration of surface 139 shown herein is by way of example only and other shapes may be formed as desired. Surface 141 which lies at an angle to the centerline of passage 142 provides a blocking surface which prevents outward flow over more than half the central passage 142 cross section. In the position of the piston shown in FIG. 3 the outer end of the piston abuts surface 141 which overlies a portion of the central passage 142 and blocks a portion thereof. The spray surface 139 is spaced from and overlying a second portion of the central passage and liquid exiting the central passage from spray pipe 112 will impinge on surface 139 to be formed into and directed as a spray.

As opposed to the structure shown in U.S. Pat. No. 3,990,637, a curved spring or washer 170 is used to urge piston curved 40 toward the spray position of FIG. 3.

In the purging position of the piston which is shown in FIG. 4, the piston upper-end no longer abuts the valving member 138 and liquid from spray pipe 162 can exit through central passage 142 and enlarged section 143 without interference. Accordingly, in the position of the piston shown in FIG. 4, a large volume of liquid from the spray pipe will exit the central passage 142 at a lower velocity than the liquid exiting central passage 142 in the spray position of the piston as shown in FIG. 3 and in the FIG. 4 position will not be directed as a spray.

It is seen therefore that in either of the two positions of piston 140 the content of the spray pipe 112 will exit through central passage 142.

A passage 160 is provided in member 110 and communicates with the chamber 156 in the bore of member 110 by means of passage 162. Passage 160 enables an operator through a suitable control means to pressurize chamber 156 to thereby shift the piston 140 to the precise position in which fines accumulated with valve 40 are ejected. Of course, the pressure must be large enough to overcome the force of curved spring 170.

In the present invention, the piston is held normally in the upward or spray position shown in FIG. 3 by the water or liquid pressure within spray pipe 162, and by the pressure of spring 170. Hence, the normal positions for the piston and the valve is the spray position. In order to move the piston to the purging position, it is necessary that chamber 156 be pressurized by air pressure through conduits 160 and 161. Such action can instantaneously overcome the force developed by the water pressure and spring 170 and rapidly move the piston from the spray position to the purging position shown in FIG. 4. Passage 166 in member 110 is used to vent the bore of member 110 beneath seal 146 to atmosphere.

In U.S. Pat. No. 3,990,637, the high water pressure had to be used to positively move the piston to the spring position of FIG. 3. In the present invention, the use of a curved spring 170 ensures that once the control pressure in passage 160 is removed, the piston 140 moves back to the normal position even without assistance from the pressure of the water in pipe 162.

Obviously, numerous modifications can be made to this invention without departing from its scope, as defined in the appended claims.

I claim:
1. A strainer device comprising:
   a screen having a central opening;

delivery means for delivering a solid/liquid mixture to said screen;

liquid collecting means disposed under said screen for collecting strained liquid from said screen;

solid collecting means disposed under said opening for collecting solids from said screen;

a vacuum source means coupled to said liquid collecting means for reducing the pressure within said liquid collecting means to force liquid to flow through said screen; and solid removal means for removing solids from said screen to prevent solids form being deposited on said screen by vacuum from said vacuum source and to move said solids from said screen into said opening, said solid removal means including a plurality of nozzles directing fluid at said screen.

2. The strainer device of claim 1 wherein said screen is disposed at an angle in the range of 0°–45° with respect to a horizontal plane.

3. The strainer of claim 1 wherein said screen is angled toward said opening.

4. The strainer of claim 3 wherein said screen is conical.

5. The strainer of claim 1 further comprising pipes for delivering said fluid, said nozzles being mounted on said pipes.

6. The strainer of claim 5 further comprising means for rotating said pipes above said screen.

7. The strainer of claim 5 wherein said vacuum source means functions to establish an internal pressure in said liquid collecting means which is about 1 inch to 12 inches of water below ambient pressure.

8. The strainer of claim 1 wherein said liquid collecting means includes a container and wherein said vacuum source means applies a vacuum to said container whereby said container has an internal pressure below ambient pressure.

9. The strainer of claim 1 wherein said nozzles include delivery means for delivering said fluid at a pressure sufficient to roll said solids.

10. The strainer of claim 1 wherein said nozzles include delivery means for delivering said fluid at a pressure in the range of 40 lb./sq. in.–70 lb./sq. in.

11. The strainer of claim 1 wherein each said nozzle includes a housing, a piston reciprocating between a spray position and a purge position, and spring means for urging said piston toward said spray position.

* * * * *